US009120572B2

(12) United States Patent
Wilkinson et al.

(10) Patent No.: US 9,120,572 B2
(45) Date of Patent: Sep. 1, 2015

(54) AIRCRAFT CREW CABIN CHANGING AREA

(75) Inventors: Michael Wilkinson, Hitchin (GB);
Hayley Mortimer, Bedford (GB)

(73) Assignee: B/E Aerospace, Inc., Wellington, FL (US)

( * ) Notice: Subject to any disclaimer, the term of this patent is extended or adjusted under 35 U.S.C. 154(b) by 20 days.

(21) Appl. No.: 13/606,740

(22) Filed: Sep. 7, 2012

(65) Prior Publication Data

US 2013/0240669 A1   Sep. 19, 2013

Related U.S. Application Data

(60) Provisional application No. 61/534,181, filed on Sep. 13, 2011.

(51) Int. Cl.
*B64D 11/00* (2006.01)

(52) U.S. Cl.
CPC ............ *B64D 11/0023* (2013.01); *B64D 11/00* (2013.01); *B64D 2011/0076* (2013.01)

(58) Field of Classification Search
USPC ................................. 244/118.5, 129.5, 199.4
See application file for complete search history.

(56) References Cited

U.S. PATENT DOCUMENTS

| | | | | |
|---|---|---|---|---|
| 4,102,011 A * | 7/1978 | Clack, Jr. | ........................ | 16/261 |
| 5,322,244 A * | 6/1994 | Dallmann et al. | ......... | 244/118.5 |
| 6,007,025 A * | 12/1999 | Coughren et al. | ......... | 244/118.6 |
| 6,189,883 B1 | 2/2001 | Wright et al. | | |
| 6,257,523 B1 * | 7/2001 | Olliges | ...................... | 244/118.5 |
| 6,696,979 B2 * | 2/2004 | Manten et al. | ................ | 340/945 |
| 6,702,231 B2 * | 3/2004 | Ward | ......................... | 244/118.5 |
| 6,761,332 B1 * | 7/2004 | Bengtsson | ................. | 244/118.5 |
| 7,198,228 B2 * | 4/2007 | Mills et al. | ................. | 244/118.5 |
| 7,441,726 B2 | 10/2008 | Melberg et al. | | |
| 7,934,679 B2 * | 5/2011 | Bock et al. | ................. | 244/118.6 |
| 8,038,100 B2 * | 10/2011 | Osborne et al. | ............ | 244/129.5 |
| 8,234,753 B2 * | 8/2012 | Cook | .............................. | 16/262 |
| 8,517,307 B2 * | 8/2013 | Saint-Jalmes et al. | ...... | 244/118.5 |
| 2011/0210205 A1 | 9/2011 | Bock et al. | | |
| 2011/0272104 A1 * | 11/2011 | Dimitrakoudis | .............. | 160/188 |

OTHER PUBLICATIONS

International Search Report, Dec. 18, 2012, 2 pages.

* cited by examiner

*Primary Examiner* — Brian M O'Hara
*Assistant Examiner* — Keith L Dixon
(74) *Attorney, Agent, or Firm* — Fulwider Patton LLP

(57) ABSTRACT

An aircraft crew cabin rest area that is formed between the aircraft galley and a console, or between any two aircraft monuments, utilizing special folding and extendible doors and specialized locking means.

10 Claims, 7 Drawing Sheets

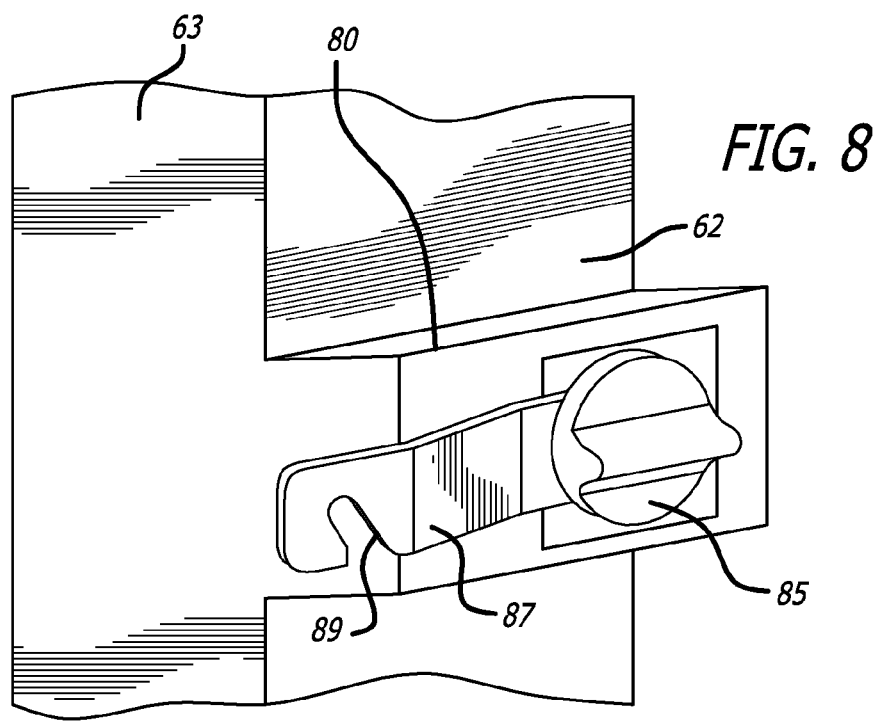
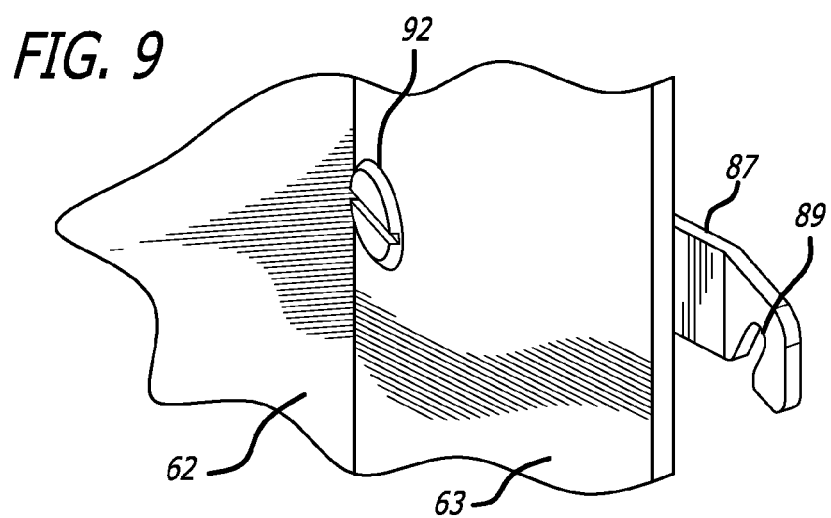

AIRCRAFT CREW CABIN CHANGING AREA

CROSS-REFERENCES TO RELATED APPLICATIONS

This application claims priority from U.S. application Ser. No. 61/534,181, filed Sep. 13, 2011, incorporated by reference in its entirety.

BACKGROUND

Most commercial aircraft that services a large number of passengers include a structure known as a "galley" that flight attendants use to prepare food and beverages for the passengers. The galley includes equipment for food preparation such as ovens and refrigerators, as well as food storage and preparation equipment. There can also be beverage makers, trash compactors, or other types of appliances used in the preparation and service of the food and beverage. The galley is typically large enough to store beverage carts that are filled with sodas and waters, and are wheeled to the passengers during the beverage service portion of the flight. Other carts can be used to keep meals warm while they are delivered to the passengers. In large aircraft that conduct transoceanic flights, there is often a crew rest area build above the galley.

During flight, the galley/rest area can move during turbulence as well as normal flight. This shifting prevents other structures from being rigidly attached to the galley, as the shifting can cause damage to the adjoining structure due to the weight of the galley and crew rest area. Thus, the galley is usually a stand-alone structure, or "monument", in the aircraft architecture. In many aircraft, adjacent the galley is a stowage console that provides space to store additional carts and the like. The console and galley provide two heavy, free standing monuments that have a gap between them of 1 to 1.5 meters.

Because space on an aircraft, especially floor space, is so important, there have been attempts to use this gap for various purposes. One such purpose is to use the area between the stowage console and the galley as a crew changing area, where flight attendants and crew members can have some privacy to change clothes or the like. To this end, doors are fashioned to the console that can swing about and attach to the galley, providing a four sided "room" between the galley and the console that serves as the crew changing area.

The difficulty or challenge with forming a crew rest area between the console and the galley is two-fold. First, the galley's movement in flight creates a problem with making a rigid attachment between the two monuments, as the shifting can cause significant stresses on the doors and the joints. This would lead to the doors breaking in most cases, as the rigid connection is no match for the inertia of the galley as it shifts. However, without a rigid connection the doors could unexpectedly open, which is problematic for a changing area. The second issue is coming up with a reliable securing means that provides privacy to the occupant without gaps or line of sight openings, while providing some contingency for opening the door from the outside. The present invention addresses both of these issues.

SUMMARY OF THE INVENTION

The present invention is an aircraft crew cabin rest area that is formed between the aircraft galley and a console, or between any two monuments, utilizing special folding and extendible doors and specialized locking means.

BRIEF DESCRIPTION OF THE DRAWINGS

FIG. 8 is an enlarged view of a locking mechanism; and

FIG. 9 is an opposite view of the door locking mechanism of FIG. 8.

DETAILED DESCRIPTION OF THE PREFERRED EMBODIMENTS

Figure 1:
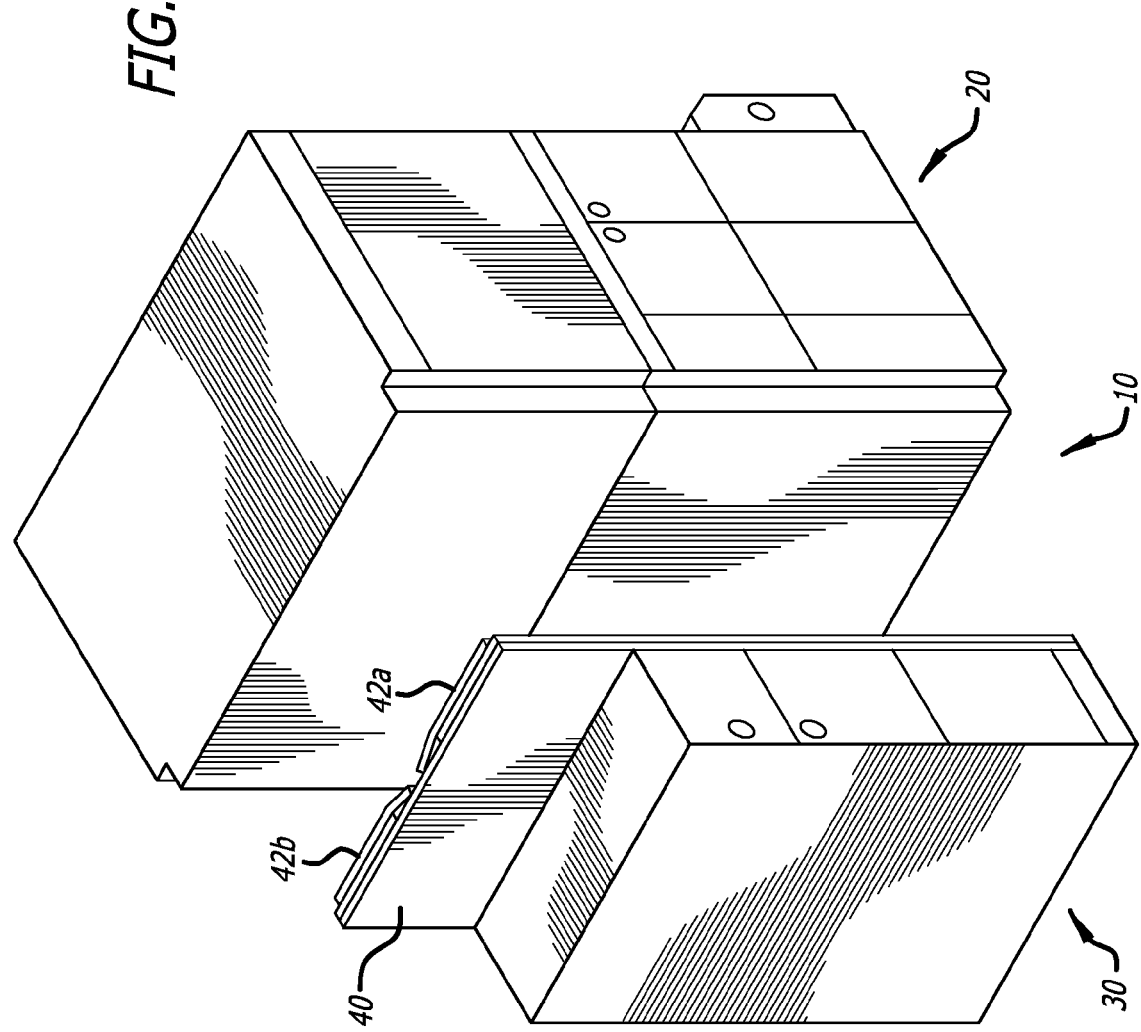
FIG. 1 is an elevated, perspective view of the changing area of the present invention with the doors open.
Figure 2:
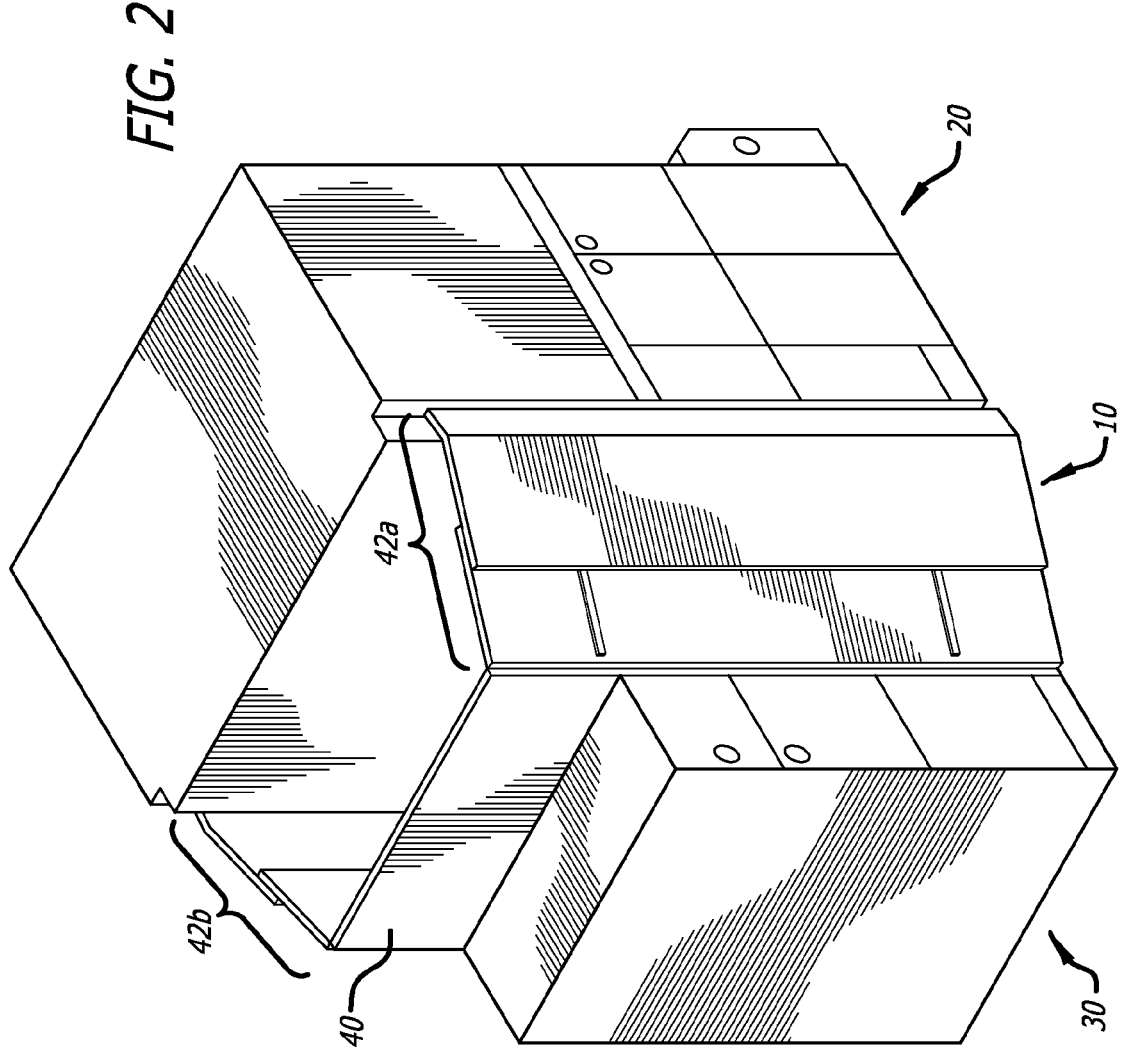
FIG. 2 is an elevated, perspective view of the changing area of the present invention with the doors closed.
Figure 3:
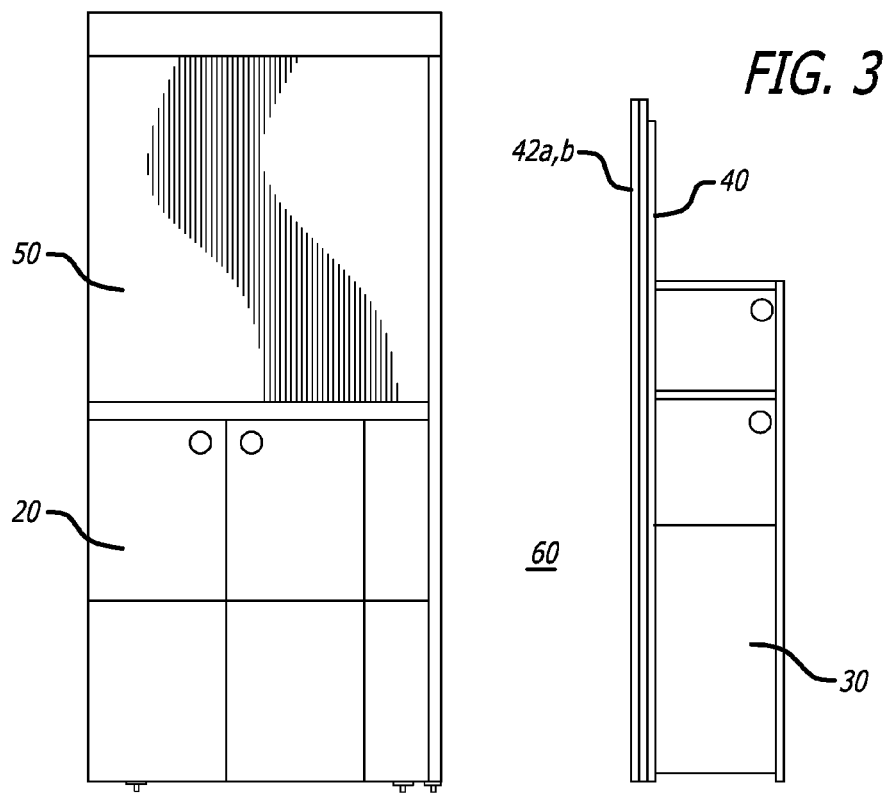
FIG. 3 is a side view of the console and galley spaced apart to show the dressing area.
Figure 4:
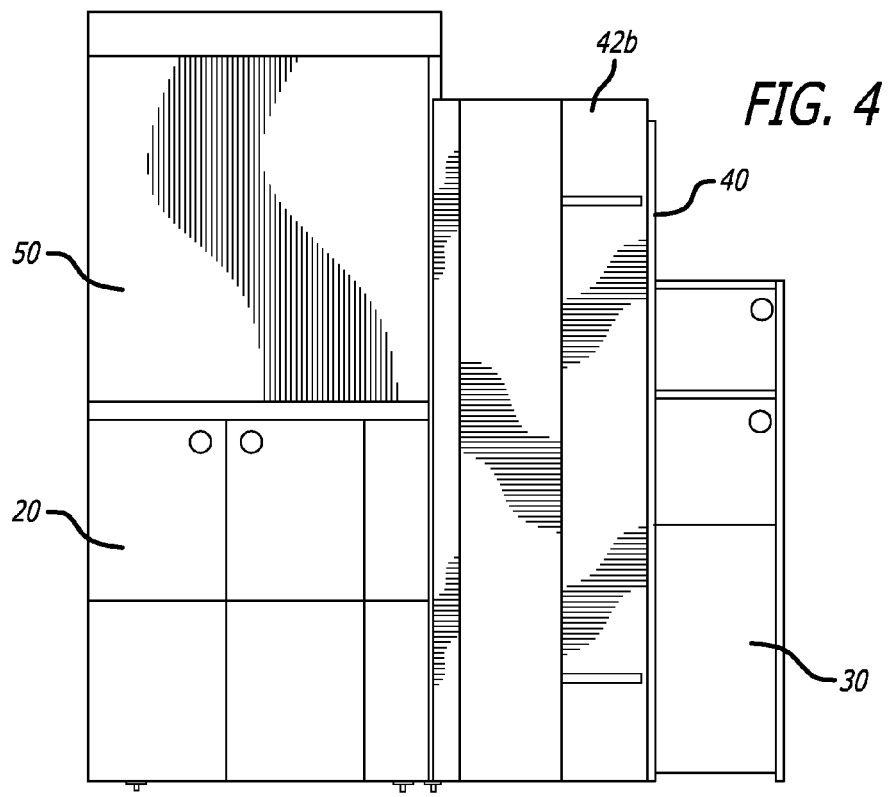
FIG. 4 is a side view of the console and the galley with the door closed.

FIGS. 1 and 2 illustrate a foldable crew changing area structure 10 that can be used with a galley 20 or other aircraft monument. In the example of FIGS. 1 and 2, the changing area structure 10 is established between a galley 20 and a console 30 that may be used for stowage or the like. Other monuments can also serve as anchors or closures for the present invention. The foldable crew changing area structure 10 comprises a base wall 40 that may be secured to the console 30. The height of the base wall 40 is preferably five to six feet or more to prevent outsiders from peering into the crew changing area, and the width of the base wall 40 may be generally the same as the console 30. The base wall 40 has a top edge, a bottom edge, and first and second side edges. Along each side edge is at least one hinge 46, preferably a piano hinge, that connects the base wall 40 to respective side walls 42a,b. The side walls are connected to the hinge 46 such that they can swing about the base wall 40 in an arc from approximately 0° to at least 160° or more. Each side wall 42a,b is preferably the same height as the base wall 40, forming an enclosure that is at least five feet high and preferably even higher. As shown in FIG. 2, the side walls 42a,b can rotate into contact with the galley 30, which includes a crew rest compartment 50 on top of the galley 30 (FIG. 3). When the side walls 42a,b are rotated into contact with the galley 20 (and crew cabin rest area 50), the side walls 42a,b, base wall 40, and galley 20 form a four sided enclosure that can serve as a temporary crew changing area 60.

Figure 5:
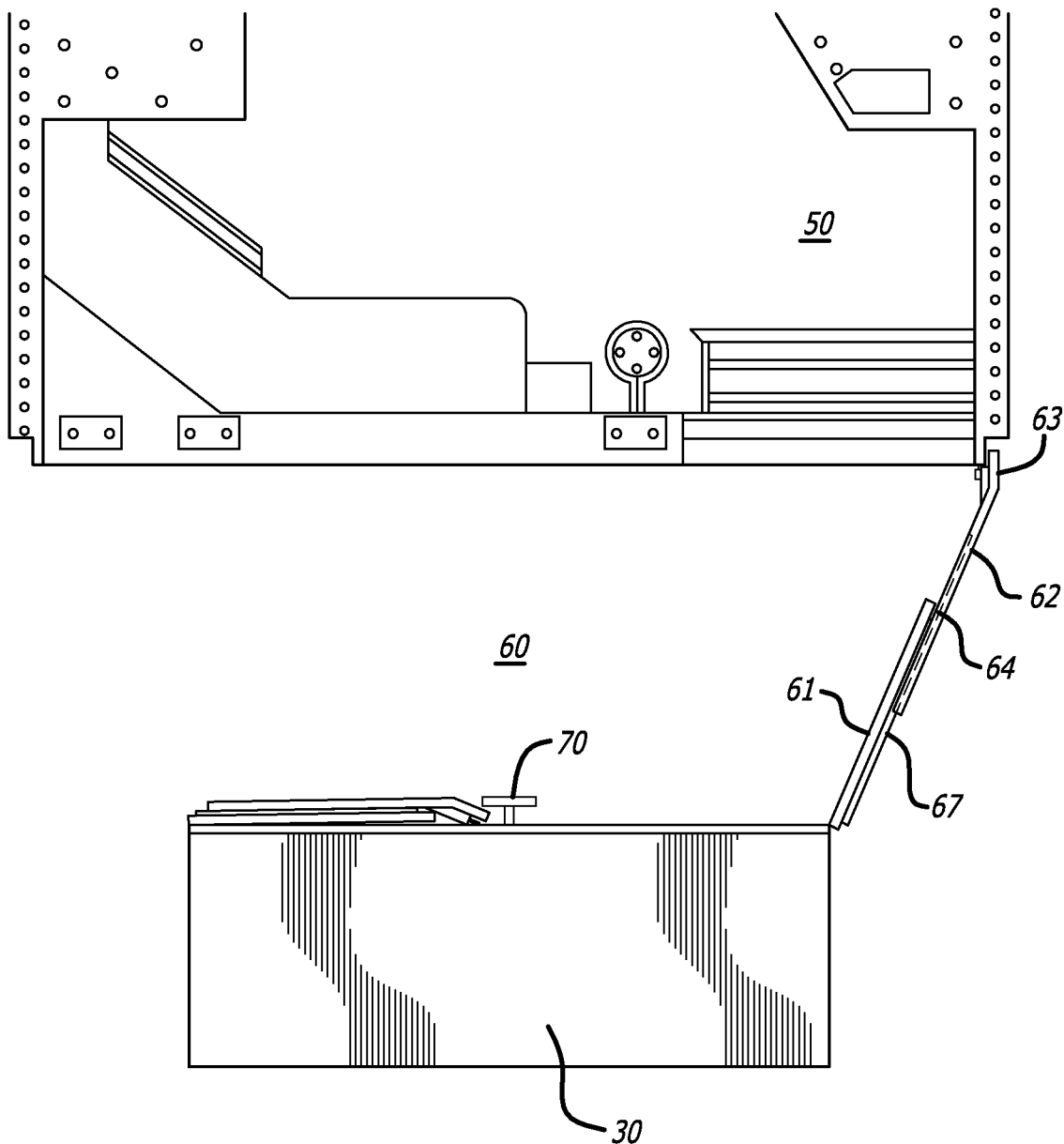
FIG. 5 is a plan view of the changing area showing the position of the doors in the open and closed position.
Figure 6:
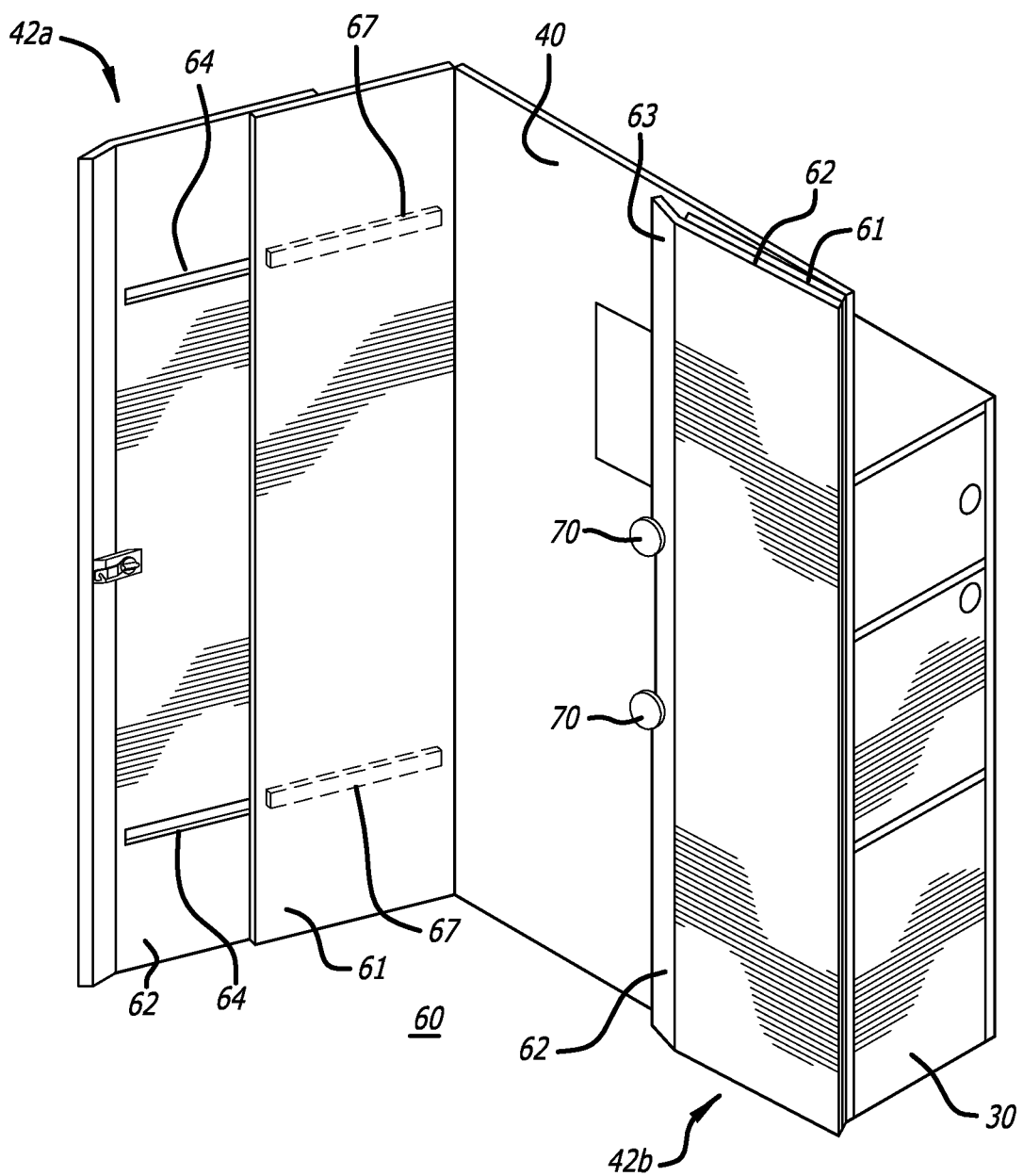
FIG. 6 is a view of the interior of the dressing area.

FIGS. 5 and 6 shows the crew changing area 60 established between the side walls 42a,b, the base wall 40, and the galley/crew rest area 50. FIG. 5 also shows how the side walls 42a,b can be collapsed and stowed against the base wall 40 when not in use. The unique construction of the side walls 42a,b allow the side walls to be stowed against the base wall 40. The side walls 42a,b are formed of an inner panel 60 that is directly hinged to the base wall 40 via the hinge 46, and an outer panel 62 that slides on an outer surface of the inner panel 61. The outer panel 62 can include a horizontal slot 64 that engages knobs or projections 67 on the outer surface of the inner panel 61 that allows the outer panel to slide horizontally along the inner panel 61. In this manner, the outer panel 62 can extend and retract to adjust the physical length of the side walls 42a,b. This adjustable length allows the crew cabin changing area 60 to accommodate vibration and movement that the galley experiences during flight and prevents stress or interference from building in the structure.

FIG. 6 shows the changing area with a first side wall 42a extended and the other side wall 42b stowed. Each side wall includes the inner panel 61, an outer panel 62, and a distal skirt 63 angled toward the base wall 40 when the side walls are in the stowed position. The skirt 63 and the outer panel 62 cooperate to enclose the inner panel 61 when in the stowed position, and the base wall 40 includes latches 70 that can secure the skirt 63 and the side wall 42a,b to the base wall to maintain the walls in the stowed position when not in use. The latches 70 can be harmonized with outer latches in the cabin to maintain a continuous decorum.

Figure 7:
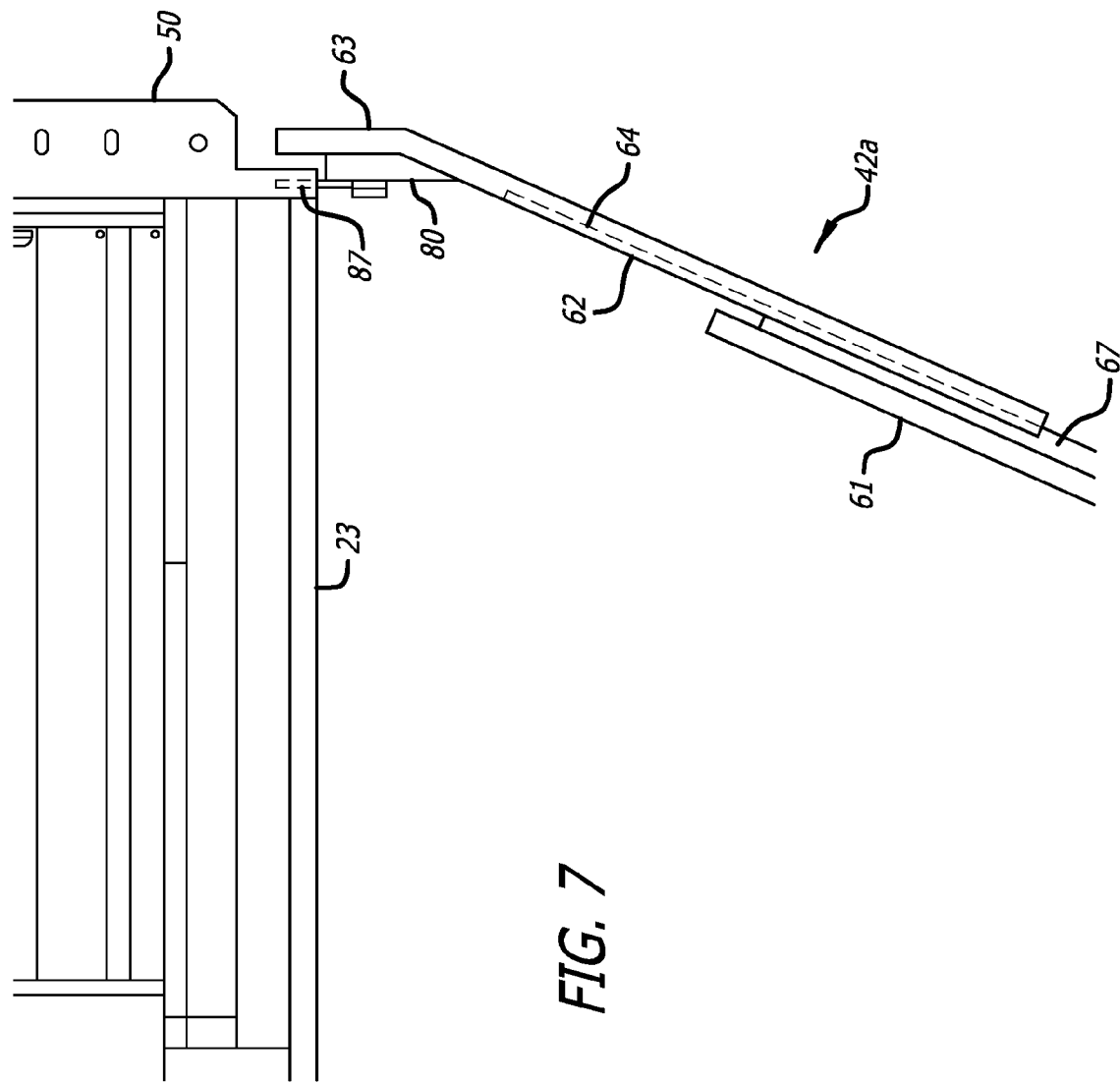
FIG. 7 is a top view of the door mating with the galley edge.

FIG. 7 shows an enlarged view of the juncture between the side wall 42a and the galley 20. The galley includes a pin, lug, or catch (not shown) that is latched by a locking mechanism 80 at the distal end of the side wall 42a. The skirt 63 extends beyond the front edge 23 of the galley 20 so that there is no line of sight from outside the changing area into the changing area. The ability of the door 42a to extend to various lengths due to the sliding arrangement between the inner panel 61 and the outer panel 62 allows a custom fit between the galley 20 and the base wall 40, and also some shock absorbing characteristics that prevent stress in the side walls 42a,b when the galley oscillates or vibrates during flight. Without the adjustable characteristic of the side walls 42a,b, movement of the galley 20 and crew rest area 50 would place undue stress on the joints and connections of the side walls, leading to damage. The doors 42a,b also provide for lateral deflections of the crew rest compartment 50 on the galley 20 as can occur in flight. FIG. 7 shows a gap between the skirt 63 and the crew rest 50, whereas the side wall 42 is connected to the galley 20. Without this gap, the crew cabin rest area 50 could extend against the side wall 42 and damage it, but the angular position of the skirt 63 prevents deflection up to several inches.

FIGS. 8 and 9 illustrate a locking mechanism for closing and locking the changing area 60. The outer panel 62 and skirt 63 are connected by a connector 80, that mounts a rotary dial 85. The rotary dial 85 operates a latch bar 87 with a hook 89 at a distal end. The hook 89 can be rotated onto a pin or lug on the galley 20 to lock the side wall 42a in place. The rotary dial is manually rotated into the locked position, and when the user is finished the rotary dial 85 is rotated so that the hook 89 disengages with the galley to release the side wall, allowing a person to exit the changing area 60. In a preferred embodiment, the locking mechanism can also be operated from the outside of the changing area, such as by a slotted coupling 92 as shown in FIG. 9. In a preferred embodiment, the locking mechanism requires a tool such as a screwdriver or the like to release the lock, such that entrance to the changing area cannot be accessed by merely turning a dial from the outside. This is so the changing area is relatively secure and a person changing in the changing area has some comfort that an outsider will not accidentally walk in on the person changing.

The embodiments and descriptions above are intended to illustrate the present invention without limiting the invention to the descriptions or figures. Rather, one of ordinary skill in the art will readily recognize modifications and alterations to the aforementioned descriptions and illustrations, and the present invention is intended to include all such modifications and alternations. Accordingly, the scope of the present invention is properly limited to the words of the appended claims, using their plain and ordinary meanings with context, but not limitation, provided by the descriptions and illustrations provided herein.

We claim:

1. A collapsible changing area for an aircraft galley, comprising
   a base wall defining a first plane and having first and second lateral edges;
   first and second doors attached via hinges to the base wall at said first and second lateral edges, the hinges permitting the first and second doors to pivot about the hinges from a stowed position against the base wall and parallel to the first plane to an engaged position against an adjacent monument, where the first and second doors swing through an arc greater than ninety degrees in opposite directions to engage the adjacent monument;
   the first and second doors each comprising an inner panel connected to the base wall at said hinges to rotate thereabout, and an outer panel radially extendable from the inner panel, the outer panel having a main section and an angled distal skirt that extends along a distal edge from a bottom edge to a top edge and that is received in a recessed portion of the adjacent monument that extends from a bottom edge to a top edge when the first and second doors are rotated against the adjacent monument;
   a manually operated locking unit for locking the first door to an adjacent monument;
   whereby an enclosed space is formed between the base wall, the first door, the second door, and the adjacent monument, that is locked using said manually operated locking units from inside the enclosed space.

2. The collapsible changing area of claim 1, further comprising a second locking mechanism outside the enclosed space for releasing the door from the adjacent monument.

3. The collapsible changing area of claim 2, wherein the second locking mechanism is not manually operated but requires a tool.

4. The collapsible changing area of claim 1 wherein the angled distal skirt of the outer panel overlaps the adjacent monument to prevent a line of sight into the enclosed space.

5. The collapsible changing area of claim 1 wherein the manually operated locking unit comprises a hook that couples to a complimentary component of the adjoining monument.

6. The collapsible changing area of claim 5 wherein the hook is connected to a rotary dial.

7. The collapsible changing area of claim 1, further comprising at least one latch to releasably fix the doors to the base wall.

8. The collapsible changing area of claim 1, wherein the inner panels rotate about the base wall at the hinges through an arc of at least one hundred sixty degrees.

9. The collapsible changing area of claim 1, wherein the base wall includes a latch that engages the angled skirt of the first and second doors to prevent the first and second doors from rotating out of the first plane.

10. The collapsible changing area of claim 9, wherein the latch can engage the first door to maintain the first door in the stowed position while the second door is engaged with the adjacent monument.

* * * * *